(12) United States Patent
Jensen

(10) Patent No.: US 9,103,249 B2
(45) Date of Patent: Aug. 11, 2015

(54) FLYWHEEL MECHANICAL ENERGY DERIVED FROM ENGINE EXHAUST HEAT

(75) Inventor: Jeffrey Edward Jensen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 739 days.

(21) Appl. No.: 13/407,824

(22) Filed: Feb. 29, 2012

(65) Prior Publication Data

US 2013/0219882 A1    Aug. 29, 2013

(51) Int. Cl.
| F01K 23/06 | (2006.01) |
| F01N 5/02 | (2006.01) |
| F01K 5/02 | (2006.01) |
| F02G 5/02 | (2006.01) |
| F01K 15/02 | (2006.01) |

(52) U.S. Cl.
CPC ... *F01N 5/02* (2013.01); *F01K 5/02* (2013.01); *F01K 15/02* (2013.01); *F01K 23/065* (2013.01); *F02G 5/02* (2013.01); *Y02T 10/16* (2013.01)

(58) Field of Classification Search
CPC ....... F01K 23/065; F01K 15/02; F01K 23/06; F02G 5/02; Y02T 10/16
See application file for complete search history.

(56) References Cited

U.S. PATENT DOCUMENTS

| 4,235,077 A * | 11/1980 | Bryant ............................ 60/618 |
| 6,374,613 B1 | 4/2002 | Filippone |
| 6,450,283 B1 | 9/2002 | Taggett |
| 6,470,680 B1 * | 10/2002 | Janeke ............................ 60/597 |
| 6,718,768 B2 * | 4/2004 | Shaffer ......................... 60/605.1 |
| 6,910,333 B2 | 6/2005 | Minemi et al. |
| 7,454,912 B2 | 11/2008 | Yamanaka et al. |
| 7,690,213 B2 | 4/2010 | Inaba |
| 7,730,723 B2 | 6/2010 | Yaguchi et al. |
| 8,061,139 B2 | 11/2011 | Bronicki |
| 8,739,531 B2 * | 6/2014 | Teng et al. ...................... 60/618 |
| 2003/0115877 A1 * | 6/2003 | Bara et al. ....................... 60/620 |
| 2007/0204611 A1 * | 9/2007 | Sawada et al. .................. 60/520 |
| 2011/0072816 A1 | 3/2011 | Ernst et al. |
| 2011/0192163 A1 * | 8/2011 | Kasuya ........................... 60/624 |
| 2011/0193346 A1 * | 8/2011 | Guzman et al. ................. 290/52 |
| 2012/0006024 A1 | 1/2012 | Hays et al. |

FOREIGN PATENT DOCUMENTS

| EP | 2336537 A1 | 6/2011 |
| JP | 58088409 A | 5/1983 |
| JP | 2005-282363 A | 10/2005 |
| JP | 2011-007192 A | 1/2011 |

* cited by examiner

*Primary Examiner* — Jesse Bogue
(74) *Attorney, Agent, or Firm* — Miller, Matthias & Hull LLP

(57) ABSTRACT

An engine exhaust heat recovery system includes an engine exhaust heat conduit that interacts with a two-phase fluid that exists in liquid and gaseous states within a single closed loop. A first heat exchanger, which may be a boiler, interfaces with and receives heat from the engine exhaust conduit. Exhaust heat energy converts the fluid from the liquid state into the gaseous state for transfer into a heat expander situated downstream of the first heat exchanger. The heat expander utilizes the gaseous heat energy to rotate a flywheel, and a system of clutches is situated and adapted to permit the flywheel to transfer mechanical energy for subsequent, selective production of work upon demand. In one disclosed embodiment, the heat expander may be a high-speed turbine with a rotary power shaft coupled to a transmission and a plurality of clutches adapted to engage and actuate the flywheel.

18 Claims, 2 Drawing Sheets

FLYWHEEL MECHANICAL ENERGY DERIVED FROM ENGINE EXHAUST HEAT

TECHNICAL FIELD

This disclosure relates to the capture and use of heat energy derived from internal combustion engine exhaust gases using a closed loop fluid heat transfer system. More particularly, the disclosure relates to a flywheel and clutch subsystem that may be powered by such a heat recovery mechanism to meet transient mechanical energy demands.

BACKGROUND

Loss of engine heat energy from internal combustion engines has long been an issue for designers of engines and engine exhaust systems. Numerous efforts have been made to reduce and/or capture at least a portion of such energy losses, in many cases with varying degrees of success.

Some energy recovery systems have utilized Rankine cycles, employing fluids adapted to accommodate thermal energy transfers between boiler and condenser units. Other energy recovery systems have utilized dual fluids in more complex systems, typically involving parallel closed systems for accommodating transfers of heat energy between fluids, such as an engine coolant on one side, and steam energy generated by engine exhaust on the other, to power auxiliary units associated with a work machine, or to, in combination with brake systems for example, to convert heat-derived energy into battery power. The latter systems have typically involved hybrid machines that employ engines in combination with batteries for purposes of supplying dual motive power to the machine.

Although most of the above described energy recovery systems have been successful in capturing and converting thermal energy into electrical power, for example for restoring energy into batteries, none of such systems have employed capabilities for the transient storage and use of purely mechanical energy. Mechanical to mechanical transfer capabilities may be particularly useful for off-road machines requiring transient mechanical energy resources, such as for hydraulic systems employed to lift heavy loads, for power take-off units, or for other occasional workload demands not practically met by current and/or traditional electrical power sources.

SUMMARY OF THE DISCLOSURE

In one disclosed embodiment, an engine exhaust heat recovery system includes an engine exhaust heat conduit that may interact with a two-phase fluid existing in liquid and gaseous states within a single closed loop. A first heat exchanger, such as a boiler, may interface with and receive heat from the engine exhaust conduit. The heat energy may convert the fluid from the liquid state into the gaseous state for transfer into a heat expander positioned downstream of the first heat exchanger. The heat expander may utilize the gaseous heat energy to rotate a flywheel. A system of clutches may be situated and adapted to permit the flywheel to transfer stored mechanical energy into the production of work.

In accordance with another aspect of the disclosed embodiment, the heat expander may be a high-speed turbine with a rotary power shaft coupled to a transmission and a plurality of clutches adapted to engage and actuate the flywheel.

In accordance with yet another aspect of the disclosed embodiment, a second closed loop heat exchanger may be adapted to receive the gaseous fluid from the heat expander and to convert the fluid into a liquid state.

In accordance with yet another aspect of the disclosed embodiment, an externally driven pump may be interposed between the second heat exchanger and the first heat exchanger, and the pump may be adapted to receive the fluid in its liquid state and to transfer that fluid into the first heat exchanger in a continuous cycle.

In accordance with a still further aspect of the disclosed embodiment, the heat expander may be a piston motor unit adapted to convert the gaseous heat energy into rotary motion.

DETAILED DESCRIPTION

Figure 1:
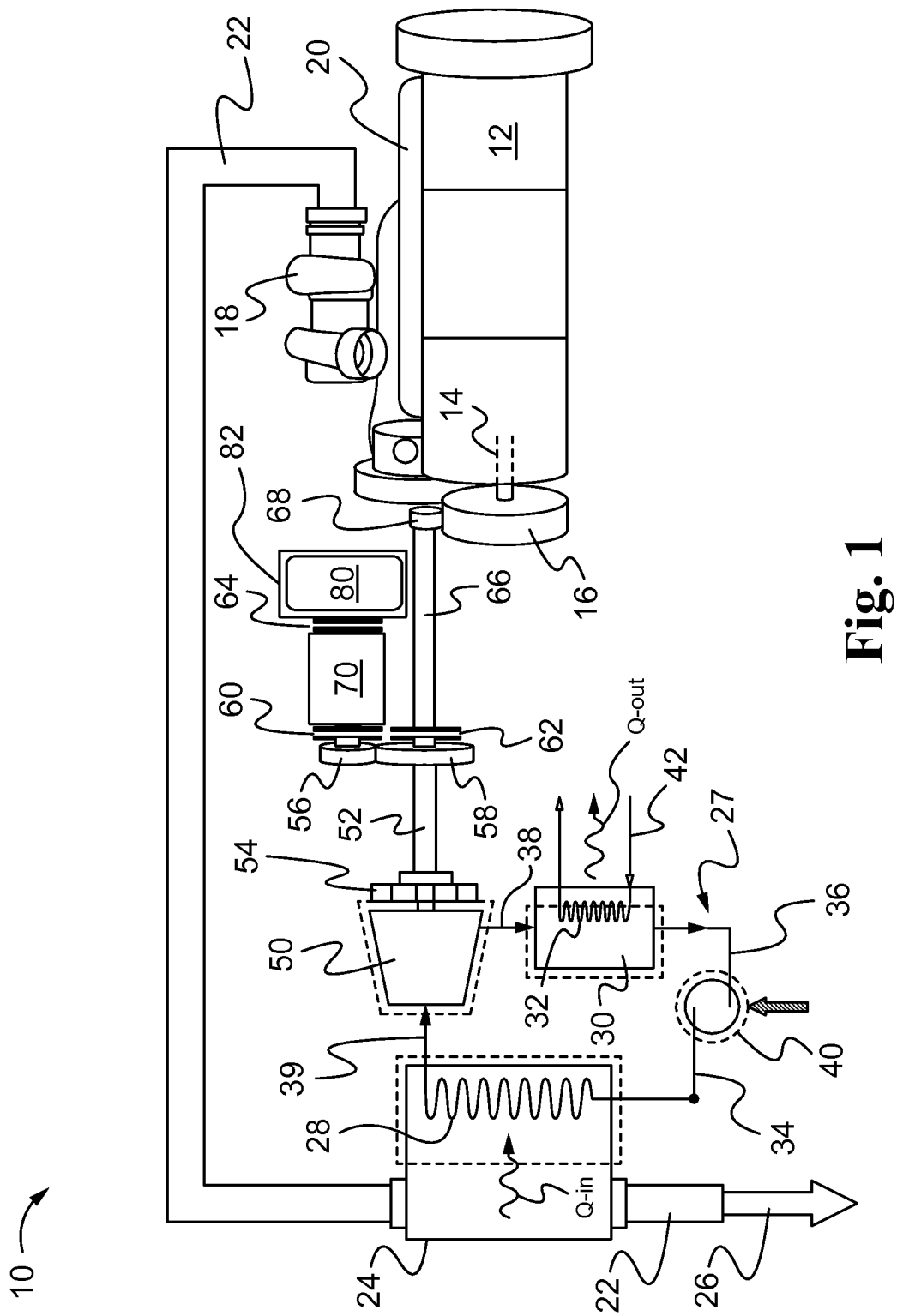
FIG. 1 is a schematic view of an engine exhaust heat recovery system, constructed in accordance with one of the disclosed embodiments.

Referring initially to FIG. 1, an engine exhaust heat recovery system 10 is displayed in accordance with one disclosed embodiment. The heat recovery system 10 includes an engine 12, having an engine crankshaft 14, shown in phantom. The crankshaft 14 rotates an engine output gear 16, as shown.

A turbocharger 18 is situated atop of an exhaust gas header 20 of the engine 12. An exhaust gas conduit 22 extends from one end of the turbocharger 18 as shown. The exhaust gas conduit 22 discharges into a first heat exchanger, a boiler 24 in the embodiment shown, and heat shown as Q-in, is transferred from engine exhaust gases 26 passing through the conduit 22.

Those skilled in the art will appreciate that a single closed loop fluid 27 may be employed to accommodate transfer of energy from the hot exhaust gases 26. For this purpose, boiler coils 28 may enable the passage of the fluid 27 through the closed loop fluid system described herein. Ideally, the fluid 27 is two-phased, existing in both liquid and gas states as it circulates within the closed fluid system. In the described embodiment, the fluid 27 is $H_2O$, which exists as water when liquid and as steam when in gaseous form.

With respect to the boiler 24, the fluid 27 enters the boiler coils 28 as water 34, and exits as steam 39, the heat, Q-in, being adapted to create sufficient temperature increase to cause the water to boil and hence to convert into steam 39. A second heat exchanger, a condenser 30 in the embodiment shown, contains condenser coils 32. As heat transferred from the condenser coils 32, shown as Q-out, is removed from the steam 38, the steam is converted back into water 36, thus providing a liquid fluid for transfer into a pump 40, which in turn provides the source of water 34 for entry into the boiler 24, in a continuous cycle. The heat, Q-out, may be removed from the condenser via an auxiliary fan unit (not shown), or via an engine coolant, whichever may be most feasible as a function of the amount of heat load involved.

Those skilled in the art will appreciate that the steam 39 travels within the closed fluid loop 27 from the boiler 24 into a heat expander 50. In the embodiment shown in FIG. 1, the heat expander is a turbine 50 having a rotary output shaft 52. Interposed between the turbine 50 and the rotary output shaft 52 is a gear set 54 adapted to reduce speed between an internal turbine shaft (not shown) and the rotary output shaft 52. In some cases, turbine speeds may approach or exceed 100,000 revolutions per minute. Such speeds exceed conventional engine operating speeds by several orders of magnitude, and thus gear reducers may be employed with continuously variable speed transmissions, clutches, and other apparatus adapted to work in concert with the turbines.

Thus, an additional pair of gears 56 and 58 is in constant mesh together to further reduce speeds at the non-driven end of the rotary output shaft 52. The gears 56 and 58 engage first and second sets of clutches 60, 62, herein called clutch packs. The clutch pack 62 is adapted to couple the rotary output shaft 52 directly to a shaft 66 affixed to a crankshaft gear 68. The latter crankshaft gear 68 is operatively meshed with the engine output gear 16, identified earlier.

It will be appreciated that the gear 56 and clutch pack 60 are adapted to engage one end of a continuously variable transmission 70. A flywheel 80 is coupled to the opposite end of the continuously variable transmission 70, and an additional clutch pack 64 is interposed between the continuously variable transmission 70 and the flywheel 80. Those skilled in the art will further appreciate that the turbine expander 50 may, by this arrangement, either engage directly with the crankshaft gear 68 or with the CVT 70 and flywheel 80, depending on the actuation of the various clutch packs. The clutch packs may offer considerable flexibility for storing mechanical energy in the flywheel 80. Such energy may be useful to operate power take-off units or various machine accessories upon demand when, for example, the engine 12 may be in an idle condition. In addition, the clutch packs may even be adapted to utilize the spinning flywheel energy to restart a stopped engine 12, for example if or when inadvertently stalled, or even if intentionally shut off to save fuel.

The flywheel 80 may ideally be housed within a sealed vacuum housing 82 to enable relatively high-speed rotation of the flywheel 80, in a range of 10,000 to 80,000 revolutions per minute, for example. A vacuum pump (not shown) assures continuity of the vacuum within the housing. Obviously, energy density of the flywheel is greater the higher the speed of rotation of the flywheel mass. To optimize stored energy, the flywheel is ideally spun up to its highest potential rotating speed. Rotation of the flywheel mass in a vacuum facilitates reduction of air friction encountered in any high speed rotation; indeed, such elimination reduces the energy otherwise required to reach any given speed of rotation of the flywheel mass. In addition, the use of ceramic or other specialized bearings may further aid in the reduction of frictional loads.

Figure 2:
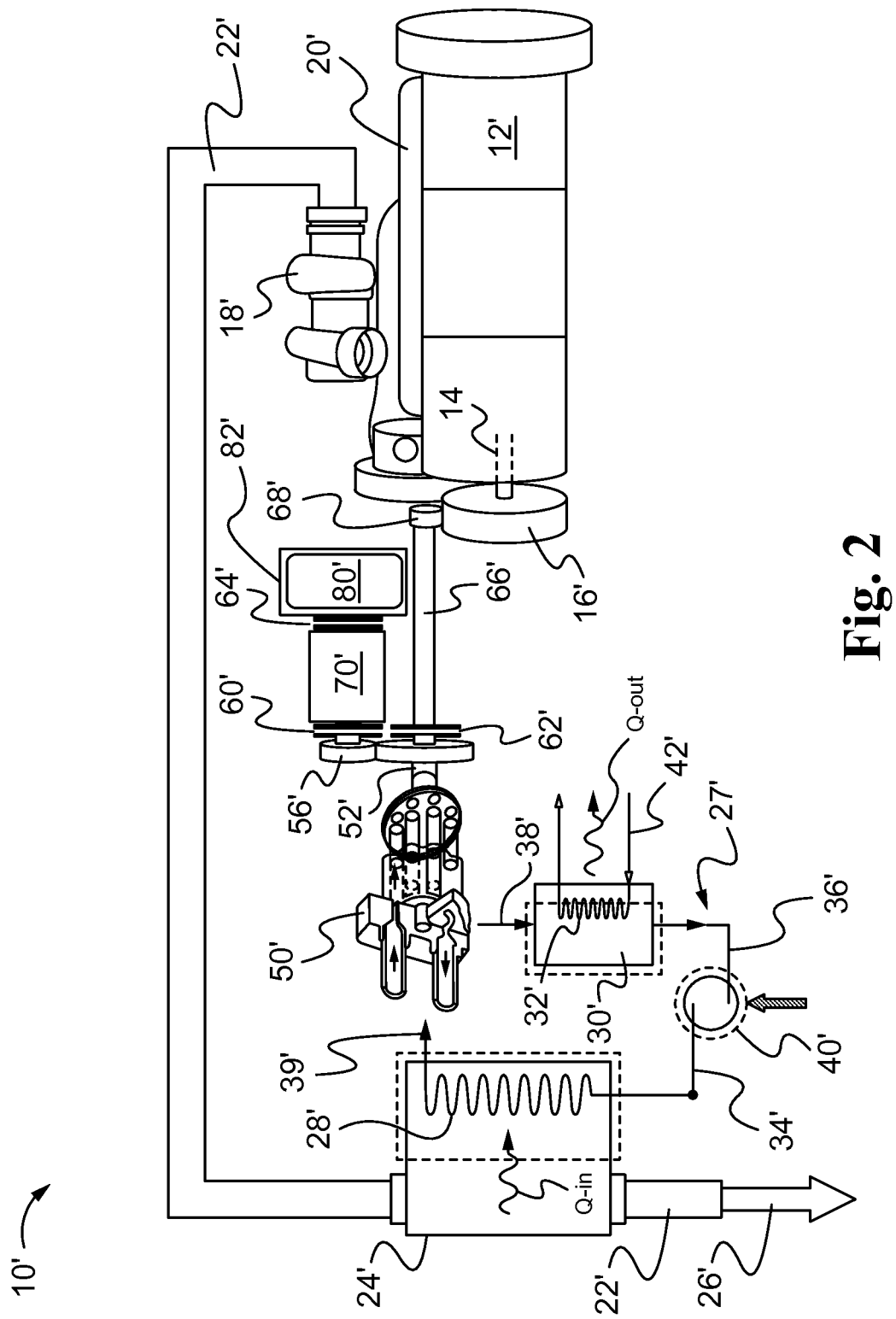
FIG. 2 is a schematic view of an alternative engine exhaust heat recovery system, constructed in accordance with another of the disclosed embodiments.

Referring now to FIG. 2, an engine exhaust heat recovery system 10' is displayed in accordance with an alternate disclosed embodiment. The heat recovery system 10' is in all respects identical to the heat recovery system 10 of FIG. 1, except that the heat expander turbine 50 has been replaced with a piston expander 50', and the gear set 54 is absent. It will be appreciated that the piston expander 50' will operate at considerably slower speeds than the turbine 50, and thus will not require as substantial of a speed reduction as required by the turbine 50. As such, the gear set 54 as utilized with the turbine 50 is not required for successful operation of the piston expander 50'.

Although only two specific embodiments have been displayed and described herein, numerous equivalents may fall within the spirit and scope of the claims appended hereinbelow.

INDUSTRIAL APPLICABILITY

The engine exhaust heat recovery system of this disclosure may have applicability in a variety of machines adapted to do useful work, including milling machines, road graders, mining machines, bulldozers, loaders, and numerous other off-highway, industrial, and agricultural machines.

In operation, the engine exhaust heat recovery system 10, 10' provides access to reserve mechanical energy upon demand via inclusion of the flywheel 80, 80' in the arrangement depicted and described herein. For example, the spinning energy dense flywheel may be utilized to supply a power take-off unit for the operation of auxiliary machines, including back hoe units, wenches, and similar devices. Alternatively, the flywheel may be utilized to supply a transient load to the crankshaft of an engine, for example immediately after the engine has stalled due to an overload.

Those skilled in the art will appreciate that, although not physically depicted herein, an electronic control module (ECM) may be advantageously included within the system to control the continuously variable transmission 70 along with the clutches 60, 62 for proper operation of the flywheel 80. As such, an ECM may be programmed to accommodate a variety of situations related to the appropriate capture, storage, and deliver of energy.

For example, the ECM may call for storage of energy in the flywheel while its associated work machine is cruising, or for the delivery of energy from the flywheel to restart the engine after the machine has been momentarily stopped. Moreover, the ECM might also conveniently be programmed to store energy in the flywheel upon the descent of the work machine down a long hill, during which time the Rankine cycle would not be needed for powering the engine. Such stored energy could, however, later be appropriately used for powering the engine for traveling uphill, etc.

Those skilled in the art will appreciate that the Rankine cycle will produce less energy during reduced engine demand periods, such as during the hill descent in the above example. Thus, the ECM may be conveniently programmed to store energy in the flywheel during application of the work machine brakes, or during other such engine retarding events when there would be little or no demand for supplying added power to the engine crankshaft, for example. Furthermore, it will be apparent to those skilled in the art that storing this otherwise lost energy in the flywheel during such retarding events might allow for reuse of that energy at later more advantageous times, such as during acceleration of the machine, its ascent up a hill, the starting of a stopped engine, or the like.

What is claimed is:

1. An engine exhaust heat recovery system comprising:
   an engine exhaust heat conduit;
   a first closed loop heat exchanger adapted to interface with and receive heat from the engine exhaust heat conduit for converting a fluid from a liquid state into a gaseous state;
   a heat expander positioned downstream from the first heat exchanger and adapted to receive the fluid therefrom in the gaseous state and to mechanically remove energy therefrom;
   a second closed loop heat exchanger adapted to receive the fluid from the heat expander and to convert the fluid from the gaseous state into a liquid state; and
   an externally driven pump interposed between the second heat exchanger and the first heat exchanger, the pump adapted to receive the fluid in its liquid state and to transfer the fluid into the first heat exchanger in a continuous cycle;
   wherein the engine exhaust heat recovery system further comprises a plurality of clutches, a transmission, and a flywheel, and wherein the clutches are adapted to selectively transfer power in parallel to either the engine, the flywheel, or to both; and wherein the heat expander includes a rotary power shaft coupled to the flywheel, such that the flywheel may develop mechanical power for subsequent, selective use upon demand to output the mechanical power to mechanical devices of a machine, wherein the heat expander is a turbine adapted to rotate at speeds of at least 100,000 revolutions per minute.

2. The engine exhaust heat recovery system of claim 1, wherein the flywheel is situated in a sealed housing, and comprises a high speed rotary mass that spins in a vacuum within the housing.

3. The engine exhaust heat recovery system of claim 2, wherein the flywheel is adapted to rotate at speeds in a range of 10,000 to 80,000 revolutions per minute.

4. The engine exhaust heat recovery system of claim 1, wherein the flywheel may be alternatively selectively coupled to auxiliary machines and to an engine crankshaft gear.

5. The engine exhaust heat recovery system of claim 1, comprising a Rankine heat energy cycle adapted to extract and capture engine exhaust heat energy for conversion thereof into mechanical energy for storage by the flywheel for later utilization.

6. The engine exhaust heat recovery system of claim 1, wherein the mechanical energy of the flywheel comprises a transient source of transferable energy.

7. The engine exhaust heat recovery system of claim 1, wherein the heat expander is a piston expander.

8. The engine exhaust heat recovery system of claim 1, wherein a heat transfer source for the second heat exchanger comprises a fan.

9. The engine exhaust heat recovery system of claim 1, wherein a heat transfer source for the second heat exchanger comprises a condenser coolant.

10. A mechanical energy storage and delivery device comprising:
    a flywheel;
    an engine exhaust heat recovery system adapted to power the flywheel; the heat recovery system including:
    an engine exhaust heat conduit;
    a first closed loop heat exchanger adapted to interface with and receive heat from the engine exhaust heat conduit for converting a fluid from a liquid state into a gaseous state;
    a heat expander positioned downstream from the first heat exchanger and adapted to receive the fluid therefrom in the gaseous state and to mechanically remove energy therefrom;
    a second closed loop heat exchanger adapted to receive the fluid from the heat expander and to convert the fluid from the gaseous state into a liquid state; and
    an externally driven pump interposed between the second heat exchanger and the first heat exchanger, the pump adapted to receive the fluid in its liquid state and to transfer the fluid into the first heat exchanger in a continuous cycle;

wherein the engine exhaust heat recovery system further comprises a plurality of clutches, a transmission, and a flywheel, and wherein the clutches are adapted to selectively transfer power in parallel to either the transmission, the flywheel, or to both; and wherein the heat expander includes a rotary power shaft coupled to the flywheel, such that the flywheel may develop mechanical power for subsequent, selective use upon demand to output the mechanical power to mechanical devices of a machine, wherein the heat expander is a turbine adapted to rotate at speeds of at least 100,000 revolutions per minute.

11. The mechanical energy storage and delivery device of claim 10, wherein the flywheel is situated in a sealed housing, and comprises a high speed rotary mass that spins in a vacuum within the housing.

12. The mechanical energy storage and delivery device of claim 11, wherein the flywheel is adapted to rotate at speeds in a range of 10,000 to 80,000 revolutions per minute.

13. The mechanical energy storage and delivery device of claim 10, wherein the flywheel may be alternatively selectively coupled to auxiliary machines and to an engine crankshaft gear.

14. The mechanical energy storage and delivery device of claim 10, comprising a Rankine heat energy cycle adapted to extract and capture engine exhaust heat energy for conversion thereof into mechanical energy for storage by the flywheel for later utilization.

15. The mechanical energy storage and delivery device of claim 10, wherein the mechanical energy of the flywheel comprises a transient source of transferable energy.

16. The mechanical energy storage and delivery device of claim 10, wherein the heat expander is a piston expander.

17. The mechanical energy storage and delivery device of claim 10, wherein a heat transfer source for the second heat exchanger comprises a fan.

18. The mechanical energy storage and delivery device of claim 10, wherein a heat transfer source for the second heat exchanger comprises a condenser coolant.

* * * * *